United States Patent Office 3,655,614
Patented Apr. 11, 1972

3,655,614
STABILIZED POLYOLEFIN COMPOSITIONS CONTAINING ALKYLATED p-HYDROXYPHENYL-ALKYLPHOSPHINATES
John Denon Spivack, Spring Valley, N.Y., assignor to Ciba-Geigy Corporation, Greenburgh, N.Y.
No Drawing. Continuation-in-part of application Ser. No. 618,988, Feb. 27, 1967, which is a continuation-in-part of application Ser. No. 612,336, Jan. 30, 1967. This application Sept. 30, 1970, Ser. No. 76,970
Int. Cl. C08f 45/58
U.S. Cl. 260—45.95
4 Claims

ABSTRACT OF THE DISCLOSURE

Unstable organic material is stabilized with certain alkylated p-hydroxyphenylalkylphosphinates. This invention is particularly useful in stabilizing polyolefins such as polypropylene and polyethylene. A particularly preferred stabilizer compound is n-octadecyl(3,5-di-tert.-butyl-4-hydroxybenzyl)ethane phosphinate.

CROSS REFERENCE

This is a continuation-in-part of a copending application Ser. No. 618,988, filed Feb. 27, 1967 now U.S. Pat. No. 3,534,127, which is a continuation-in-part of Ser. No. 612,336, filed Jan. 30, 1967, now U.S. Pat. No. 3,488,368.

This invention relates to compositions stabilized with esters of alkylated hydroxyphenylalkylphosphinic acids more specifically it relates to organic materials subject to oxidative deterioration, stabilized with said esters having the formula

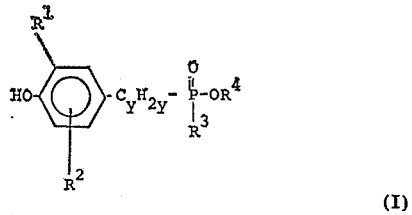

(I)

wherein $R^1$ is a lower alkyl group of from 1 to 6 carbon atoms,
$R^2$ is hydrogen or alkyl in a position ortho or meta to the hydroxy group, said alkyl group having up to 8 carbon atoms,
$R^3$ is alkyl of from 1 to 18 carbon atoms or aryl,
$R^4$ is hydroxy(lower)alkyl, alkenyl of from 3 to 6 carbon atoms, halo(lower)alkyl or alkyl of from 1 to 18 carbon atoms provided that $R^3$ is not phenyl when $R^4$ is alkyl; and
$y$ is a number from 1 to 3.

Illustrative examples of lower alkyl groups which are represented by $R^1$ and $R^2$ are methyl, ethyl, propyl, isopropyl, butyl, t-butyl, pentyl, hexyl. The preferred groups are the tertiary alkyls such as t-butyl and methyl. Illustrative examples of the alkyl groups which are represented by $R^3$ are methyl, ethyl, pentyl, hexyl, octyl, decyl, octadecyl, dodecyl, and the like, both straight chains and branched chains. The preferred groups are methyl and ethyl.

The aryl groups which are represented by $R^3$ can be phenyl, naphthyl, substituted phenyl such as tolyl and the like.

The alkylated hydroxyphenylalkylphosphinates of the present invention are useful as stabilizers of organic materials normally subject to oxidative deterioration. Such organic materials include: synthetic organic polymeric substances such as vinyl resins formed from the polymerization of vinyl halides or from the copolymerization of vinyl halides with unsaturated aldehydes and unsaturated hydrocarbons such as butadienes and styrene; polyolefins such as polyethylene, polypropylene, polybutylene, polyisoprene, and the like, including copolymers of poly-α-olefins, polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials which can be stabilized by the active compounds of the present invention include lubricating oil of the aliphatic ester type, i.e., di(2-ethylhexyl)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like hydrocarbon materials such as gasoline, mineral oil, fuel oil, drying oil, cutting fluids, waxes, resins, and the like, salts of fatty acids such as soaps and the like.

In general one or more of the stabilizers of the present invention are employed in amounts, in toto, of from about 0.005 to about 5% by weight of the composition to be stabilized. A particularly advantageous range of the present stabilizers for polyolefins such as polypropylene is from about 0.05% to about 2%.

The stabilizers employed in this invention can be also used in combination with other stabilizers or additives. Especially useful co-stabilizers are di-lauryl-beta-thiodipropionate and di-stearyl-beta-thiodipropionate.

The following formula represents co-stabilizers which are in certain instances very useful in combination with the stabilizers of this invention:

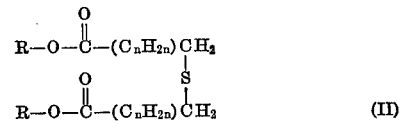

(II)

wherein R is an alkyl group having from 6 to 24 carbon atoms; and $n$ is an integer from 1 to 6. The above co-stabilizers are used in the amount of from 0.01 to 2% by weight of the organic material, and preferably from 0.1 to 1%.

Other antioxidants, antiozonants, thermal stabilizers, ultraviolet light absorbers, coloring materials, dyes, pigments, metal chelating agents, etc. may also be used in the compositions of the invention.

The compounds of this invention can be prepared by reacting an alkylated hydroxyphenylalkyl halide of the formula

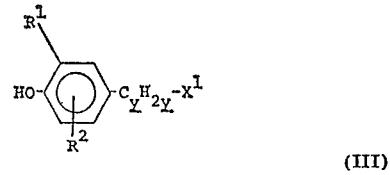

(III)

wherein $R^1$ and $R^2$ are as previously defined
$X^1$ is chloro, bromo or iodo and
$y$ has a value of from 1 to 3 inclusively, in a nonaqueous inert aprotic solvent, with a phosphorus halide (alternatively named as a halophosphine) of the formula

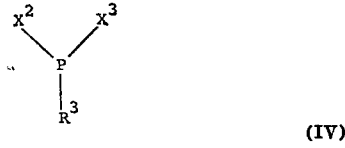

(IV)

wherein each of $X^2$ and $X^3$ is chloro, bromo or iodo and $R^3$ is alkyl or aryl, in the presence of a complexing metal halide Lewis acid. The resultant reaction complex is then treated with an alcohol of the formula $HOR^4$ wherein $R^4$ is alkyl, halo(lower)alkyl, hydroxy(lower)alkyl, aryl or aralkyl, and then dissociated through treatment with water.

With greater particularity to the nature of the reactants and conditions in preparing the compounds of the present invention, the alkylated hydroxyphenylalkyl halide reactant of Formula III may be a chloride, bromide or iodide, generally a chloride. Bridging the halogen atoms and the phenyl ring is a branched or straight chain alkylene chain of from 1 to about 18 carbon atoms. In this simplest form, this alkylene group is methylene, which together with the phenyl ring thus constitutes a benzyl group; longer and branched alkylene chains such as isobutylene, dodecylene, octadecylene and the like are however encompassed. The preferred alkylene groups are methylene and ethylene. The phenyl ring contains a hydroxy group in the para position and an alkyl group on one of the adjacent carbon atoms. A second like or different alkyl group may be optionally present on the other carbon atom adjacent to the hydroxy group or on the carbon atom meta to the hydroxy group and para to the first alkyl group. Generally, however, the alkyl groups contain a maximum of up to about 18 carbon atoms. From the standpoint of the usefulness of the final compounds, the 3,5-di-t-butyl-4-hydroxyphenylalkyl group is preferred.

The phosphorus halide reactant of Formula IV is a dihalophosphine in which the halogen atom(s) is chlorine, bromine, or iodine. Although not required, the halogens in a dihalophosphine will generally be the same. The remaining one valence bond will bear an alkyl group or an aryl group. Generally these alkyl groups will contain up to about 30 carbon atoms, preferably 18 carbon atoms and may be of a branched or straight chain structure. The aryl groups are aromatic mono and polycarbocyclic structures optionally substituted with inert groups such as alkyl, alkoxy and the like. While phenyl is the most common species, groups such as tolyl, naphthyl, chrysyl, anthracyl, t-butylphenyl, and the like are embraced.

The foregoing two reactants are generally employed in substantially equimolar amounts although an excess of the phosphorus halide can be employed. These reactants are combined with at least an equimolar amount, and generally a slight excess, of a complexing metal halide Lewis acid as for example aluminum chloride, ferric chloride, stannic chloride, boron trifluoride, titanium chloride, zinc chloride, zirconium chloride and the like. The process is preferably practiced by first dissolving or suspending the metal halide in a non-aqueous inert aprotic solvent such as nitromethane, dichloromethane, nitrobenzene, nitropropanes, chlorobenzene, dichlorobenzenes, s-dichloroethane, tetrachloroethane, perchloroethylene, petroleum ether, carbon disulfide and the like, generally at temperatures at or below 0° C., and then adding the two reactants. The reaction is then allowed to progress, with cooling if necessary, under an inert atmosphere such as nitrogen or helium and non-aqueous conditions.

The reaction mixture containing the complexed intermediate is then treated with an equivalent amount of an alcohol. This alcohol may be simple alkyl or aryl alcohol, such as methanol, ethanol, octadecanol, dodecanol, and the like or may be a halogenated alkanol such as 3-chloropropanol, or an alkane polyol such as propylene glycol, neopentylglycol, pentaerythritol or the like or an alkenylol such as allyl alcohol and the like. While there is no operative limit on the length of the alkyl chain, it will generally contain up to 30 carbon atoms and more usually up to 18 carbon atoms. Following addition of the alcohol, the reaction complex is dissociated with water as previously described. The product is isolated through the use of conventional techniques such as solvent extraction, evaporation, centrifugation or the like and further purified if necessary through recrystallization chromatography or the like.

Substituted phosphinates such as n-octadecyl(3,5-di-tert.-butyl - 4 - hydroxybenzyl)ethanephosphinate can be prepared by preparing the acid chloride of the appropriate phosphinic acid and reacting it with an alcohol.

The following examples are presented to further illustrate the present invention without introducing any limitations thereto.

EXAMPLE 1

2,2-dimethyl-3-hydroxypropyl(3,5-di-t-butyl-4-hydroxybenzyl)benzenephosphinate

A solution of 14.7 g. of aluminum chloride (0.110 mole) in 50 ml. of nitromethane was added dropwise at −15° to −12° C. over a period of 15 minutes to a solution of 25.4 g. of 3,5-di-t-butyl-4-hydroxybenzyl chloride (0.100 mole) and 18.7 g. of dichlorophenylphosphine (0.105 mole) in 50 ml. of nitromethane. The reaction mixture was stirred at −12° C. for 45 minutes and 14 g. of neopentyl glycol are added gradually over a period of 10 minutes, the temperature being allowed to rise from −10° to 0° C. The reaction mixture was then stirred at 18° to 22° C. for 3 hours and 100 ml. of water are added in a dropwise fashion at −10° to +15° C. The aqueous dispersion was extracted with 300 ml. of ether and these extracts washed with 100 ml. of 2% aqueous hydrochloric acid, dried over anhydrous sodium sulfate and evaporated to yield 2,2-dimethyl-3-hydroxypropyl-(3,5 - di-t-butyl - 4-hydroxybenzyl)benzenephosphinate which was further purified through recrystallization from 11:1 heptane:toluene, M.P. 113–115° C.

By substituting dichlorooctadecylphosphine for dichlorophenylphosphine in the above procedure, there was obtained 2,2-dimethyl-3-hydroxypropyl - (3,5 - di-t-butyl-4-hydroxybenzyl)octadecanephosphinate.

EXAMPLE 2 n-Octadecyl(3,5-di-tert.-butyl-4-hydroxybenzyl)ethanephosphinate (a) A solution of 14.7 grams of aluminum chloride (0.110 mole) in 50 ml. of nitromethane was added at −10° to −5° C. over 15 minutes to a solution of 13.1 grams of ethyl dichlorophosphine (0.100 mole) and 25.4 grams of 3,4 - di-tert.-butyl - 4-hydroxybenzyl chloride (0.100 mole). The reaction mixture was then stirred at −5° to 0° C. for two hours. The reaction mixture was then poured on to about 300 grams of ice and allowed to stand overnight and then extracted with 2× 300 ml. of toluene, the toluene solution being dried over anhydrous sodium sulfate. The filtered toluene solution was then evaporated at a reduced pressure yielding 30 grams of a white glass as residue. The product was crystallized from acetonitrile, the crystals being washed with n-heptane and dried, M.P. 155°–157° C.

(b) 5.7 grams of (3,5-di-tert.-butyl-4-hydroxybenzyl) ethanephosphinic acid was dissolved in 100 ml. of toluene. 2.1 grams of thionyl chloride was added to the toluene solution, followed by two drops of dimethylformamide, the reaction mixture being stirred for about 16 hours at room temperature. 1.9 grams of triethyl amine was added followed by the dropwise addition of 4.9 grams of n-octadecanol dissolved in 20 ml. of toluene. The reaction mixture was then stirred at room temperature for 3 hours, followed by 30 minutes at 90° C. The reaction mixture was cooled to 25° C. and the precipitated triethylamine hydrochloride filtered. The product was recovered by removing the toluene by distillation at a reduced pressure, the residual oil being recrystallized twice from nitromethane and finally from a mixture of 200 ml. of nitromethane and 25 ml. acetone. After drying the white crystals melt at 63° to 65° C.

EXAMPLE 3

2-chloroethyl-(3,5-di-tert.-butyl-4-hydroxybenzyl)benzenephosphinate

A solution of 14.7 g. of aluminum chloride (0.110 mole) in 50 ml. of nitromethane was added dropwise over a period of 15 minutes at −15° to −10° C. to a solution of 25.4 g. of 3,5-di-tert.-butyl-4-hydroxybenzyl chloride (0.100 mole) and 18.7 g. of dichlorophenyl phosphine (0.105 mole) in 50 ml. of nitromethane. The mixture was stirred at −13° C. for 45 minutes. Anhydrous ethylene glycol (7.2 g., 0.115 mole), dispersed in 252 ml. of nitromethane, was added over a period of 10 minutes at −10° C. and let stir for 3 hours at 20° C. and at 55° C. for 2 hours. The reaction mixture is then cooled to 10° C. and 100 ml. of water added at 10 to 22° C. On stirring for 16 hours at room temperature white crystals precipitate which after drying, melt at 135–138° C. (30.7 g.). After recrystallization from nitromethane, the melting point of the product was 139°–140° C.

EXAMPLE 4

By substituting allylalcohol in the procedure of Example 1, there was obtained allyl-(3,5-di-tert.-butyl-4-hydroxybenzyl)benzenephosphinate, M.P. 105°– 106° C.

EXAMPLE 5

A batch of unstabilized polypropylene powder (Hercules Profax 6501) was thoroughly blended with 0.5% by weight of n-octadecyl(3,5 - di-t-butyl-4-hydroxybenzyl)ethanephosphinate and another batch with 0.1% by weight of n-octadecyl(3,5-di-tert.-butyl-4-hydroxybenzyl)ethanephosphinate plus 0.3% by weight of DSTDP. The blended materials were then milled on a two-roller mill at 182° C. for ten minutes, after which time the stabilized polypropylene was sheeted from the mill and allowed to cool.

The milled polypropylene sheets were then cut into pieces and pressed for seven minutes on a hydraulic press at 281° C., and 2,000 pounds per square inch pressure. The resultant sheets of 25 mil thickness were tested for resistance to accelerated aging in a forced draft oven at 150° C. The results are set out in Table I below.

TABLE I

| Percent concentration of stabilizer: | Oven aging—150° C., 25 mil film, hours |
|---|---|
| 0.5 | 185 |
| 0.1+0.3 DSTDP [1] | 500 |
| Polypropylene (unstabilized) | 3 |

[1] Distearylthiodipropionate.

The above data clearly shows the significant stabilization of polypropylene upon the addition of the antioxidants of the present invention.

EXAMPLE 6

39.3 grams of nylon 6,6 salt, 0.177 gm. of hexamethylene diamine diacetate and 0.5% by weight of 2,2-dimethyl-3-hydroxypropyl-(3,5 - di-tert.-butyl-4-hydroxybenzyl)benzenephosphinate were mixed in a standard glass polymer tube with a side arm. The tube was evacuated and flashed four times with high purity dry nitrogen ending with dry nitrogen. The tube was heated for one hour in a 222° C. methyl salicylate vapor bath during which time water is eliminated. The tube was then placed in a second vapor bath at 275° C. (orthophenyl phenol) for one hour and then evacuated to 0.1 mm. for an additional ½ hour. The tube was removed from the heat and nitrogen introduced.

The nylon plug was ground to about 20 mesh granules. Initial viscosity of the nylon in reagent grade sulfuric acid (0.5% by weight) was determined at 30° C. The granules were aged for 65 hours at 140° C. in a forced draft oven, after which time the viscosity of the nylon was again determined and reported as to percent retention of original viscosity.

The thus stabilized nylon 6,6 showed a 91% retention of viscosity after testing while the blank containing no stabilizer showed only a 62% retention of viscosity.

EXAMPLE 7

A water-white, refined (U.S.P. grade) mineral oil (Esso PRIMOL D) was stabilized under the following test conditions.

A sample of mineral oil (10 gms.) containing 0.10% by weight allyl (3,5-di-tert.-butyl-4-hydroxybenzyl)benzenephosphinate was placed in a Sligh type oxidation flask filled with oxygen at room temperature (25° C.) and atmospheric pressure. Thereafter, the flask was sealed to form a system having a mercury manometer which measures the pressure changes as oxygen is absorbed by the sample in the flask. The sample was then heated at 150° C. until the manometer registered a decrease of 300 mm. Hg pressure within the flask with reference to the maximum pressure obtained at 150° C. The results are set out in Table II below:

TABLE II

| Percent concentration of stabilizer: | Hours to failure at 150° C. |
|---|---|
| Unstabilized oil | 2.5 |
| 0.1 | 17.5 |

What is claimed is:

1. A composition of matter stabilized against oxidative deterioration which comprises polyolefin material normally subject to oxidative deterioration containing from 0.005 to 5% by weight of a stabilizing compound of the formula

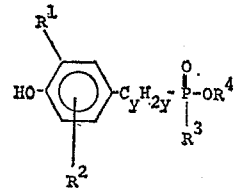

wherein
R[1] is a lower alkyl group of from 1 to 8 carbon atoms,
R[2] is hydrogen or alkyl in a position ortho or meta to the hydroxy group, said alkyl group having up to 8 carbon atoms,
R[3] is alkyl of from 1 to 18 carbon atoms or aryl group,
R[4] is hydroxy(lower)alkyl, alkenyl of from 3 to 6 carbon atoms, halo(lower)alkyl or alkyl of from 1 to 18 carbon atoms, provided that R[3] is not phenyl when R[4] is alkyl, and
y is a number from 1 to 3.

2. A composition of matter according to claim 1 wherein the polyolefin material is polypropylene and the stabilizing compound is 2,2-dimethyl-3-hydroxypropyl-(3,5-tert.-butyl-4-hydroxybenzyl)benzenephosphinate.

3. A composition of matter according to claim 1 wherein the polyolefin material is polypropylene and the stabilizing compound is allyl-(3,5 - di-tert.-butyl-4-hydroxybenzyl)benzenephosphinate.

4. A composition of matter according to claim 1 wherein the polyolefin material is polypropylene and the stabilizing compound is n-octadecyl-(3,4-di-tert.-butyl-4-hydroxybenzyl)ethanephosphinate.

References Cited

UNITED STATES PATENTS

| 3,488,368 | 1/1970 | Spivack | 260—45.75 |
| 3,534,127 | 10/1970 | Spivack | 252—400 |

DONALD E. CZAJA, Primary Examiner

V. P. HOKE, Assistant Examiner

U.S. Cl. X.R.

99—163; 260—398.5, 666.5